United States Patent
Panje (10) Patent No.: US 10,250,663 B2
(45) Date of Patent: Apr. 2, 2019

(54) GATEWAY STREAMING MEDIA TO MULTIPLE CLIENTS IN ACCORDANCE WITH DIFFERENT STREAMING MEDIA PROTOCOLS

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 217 days.

(21) Appl. No.: 15/210,073

(22) Filed: Jul. 14, 2016

(65) Prior Publication Data

US 2017/0019453 A1    Jan. 19, 2017

Related U.S. Application Data

(60) Provisional application No. 62/192,126, filed on Jul. 14, 2015.

(51) Int. Cl.
*H04L 29/06* (2006.01)
*H04L 29/08* (2006.01)

(52) U.S. Cl.
CPC ........ *H04L 65/608* (2013.01); *H04L 65/1023* (2013.01); *H04L 65/1069* (2013.01); *H04L 65/80* (2013.01); *H04L 67/02* (2013.01); *H04L 67/146* (2013.01)

(58) Field of Classification Search
None
See application file for complete search history.

(56) References Cited

U.S. PATENT DOCUMENTS

| | | |
|---|---|---|
| 8,230,004 B2 | 7/2012 | Igarashi |
| 9,232,278 B2 | 1/2016 | Hazan |
| 2010/0169303 A1 | 7/2010 | Biderman et al. |
| 2010/0169453 A1 | 7/2010 | Biderman et al. |
| 2012/0170501 A1* | 7/2012 | Drozt ................ H04W 72/005 370/312 |
| 2013/0054739 A1 | 2/2013 | Mao |
| 2013/0055303 A1 | 2/2013 | Kannan et al. |
| 2013/0160044 A1 | 6/2013 | Mathews et al. |
| 2013/0254341 A1* | 9/2013 | Ramakrishnan ........ H04L 47/25 709/219 |
| 2013/0282801 A1* | 10/2013 | Barrett .................. H04N 5/765 709/203 |

(Continued)

FOREIGN PATENT DOCUMENTS

WO     01/84336     11/2001

*Primary Examiner* — Joshua Joo
(74) *Attorney, Agent, or Firm* — Thomas A. Ward (57) ABSTRACT

A method is provided for delivering two or more concurrent streaming media sessions to client devices. In the method, a request is received from a client device to establish a new streaming media session while one or more ongoing streaming media sessions is in progress. A determination is made if resources are available to fulfill the request. When one or more resources needed to fulfill the request are unavailable, a response to the request is provided in accordance with a pre-established prioritization scheme that gives priority to either delivery of a total number of concurrent streaming media sessions or a quality level of the concurrent streaming media sessions being delivered.

12 Claims, 6 Drawing Sheets

(56) References Cited

U.S. PATENT DOCUMENTS

| | | | |
|---|---|---|---|
| 2014/0012971 A1* | 1/2014 | Eichen | H04L 47/801 709/224 |
| 2014/0082012 A1 | 3/2014 | Pichumani et al. | |
| 2014/0143396 A1* | 5/2014 | Tsai | H04L 65/4069 709/223 |
| 2014/0181266 A1* | 6/2014 | Joch | H04L 65/605 709/219 |
| 2015/0006742 A1 | 1/2015 | Beals et al. | |
| 2015/0082345 A1* | 3/2015 | Archer | H04L 65/605 725/34 |
| 2015/0169210 A1 | 6/2015 | Kim et al. | |
| 2015/0195374 A1* | 7/2015 | Wang | H04L 65/601 709/219 |
| 2015/0296274 A1* | 10/2015 | Good | H04N 21/84 725/93 |
| 2015/0373388 A1 | 12/2015 | Pfeffer | |

* cited by examiner

GATEWAY STREAMING MEDIA TO MULTIPLE CLIENTS IN ACCORDANCE WITH DIFFERENT STREAMING MEDIA PROTOCOLS

CROSS REFERENCE TO RELATED APPLICATION

This application claims the benefit of U.S. Provisional Application No. 62/192,126, as filed on Jul. 14, 2015, the contents of which are incorporated herein by reference.

BACKGROUND

It is becoming more commonplace for consumers of multimedia content to share content amongst a variety of networked electronic devices. In one widely adopted technique content or media is streamed from a customer premises gateway or set top box to devices such as televisions, PCs, tablets and smart phones. A number of different streaming media protocols may be used to deliver the content, some of which may be characterized as adaptive streaming protocols and others which may be characterized as non-adaptive streaming techniques. In adaptive streaming the content or media program is divided into segments or chunks which may vary in duration but are often about two-ten seconds in length. The content server publishes a playlist or high level manifest file that is accessible to the client device. The manifest file includes a list of URIs ("Universal Resource Identifiers") to media segments that make up the program. The playlist or high level manifest file identifies multiple sets of video streams for a media program, such as a movie, a television program, etc., where each set of video streams has unique encoding parameters (e.g., bit rates, resolutions, etc.) for the media program. In one variation, the high level manifest points to another set of manifest files which contain actual media URIs with various bit rates. The client device may dynamically switch between the sets of video streams identified in the high level manifest file as the sets of video streams are transmitted from the content server to the client device. The client device may choose to receive an initial set of video streams identified in the high level manifest file based on initial network conditions, initial buffer conditions, etc.

In contrast to adaptive streaming, non-adaptive streaming employs a static version of a media stream that is requested by the client device. The client device thus generally requests a static Uniform Resource Identifier (URI) for streaming.

A customer premises gateway or set-top box may serve different streaming media to multiple client at the same time using different streaming media techniques and protocols. The number of streams that can be delivered at any one time is limited by the availability of network bandwidth and the computing resources of the gateway or set-top box that are used to process the streaming media.

SUMMARY

In accordance with one aspect of the disclosed subject matter, a method is provided for delivering two or more concurrent streaming media sessions to client devices. In accordance with the method, a request is received from a client device to establish a new streaming media session while one or more ongoing streaming media sessions is in progress. A determination is made if resources are available to fulfill the request. When one or more resources needed to fulfill the request are unavailable, a response to the request is provided in accordance with a pre-established prioritization scheme that gives priority to either delivery of a total number of concurrent streaming media sessions or a quality level of the concurrent streaming media sessions being delivered. In some cases the pre-established prioritization scheme can be established by the user and/or the service provider.

In one particular implementation, one of the streaming media sessions is to be streamed in accordance with an adaptive streaming protocol and another of the streaming media sessions is to be streamed in accordance with a non-adaptive streaming protocol. When priority is given to a total number of sessions and resources are limited, the media stream(s) being streamed or to be streamed in accordance with the adaptive streaming protocol may be limited in quality by sending to the client device a lower bit rate media stream than was requested by the client device. If, on the other hand, all the resources needed to stream all the requested streaming media sessions are available, the requested media stream(s) that conform to the adaptive streaming protocol will be delivered at the highest quality the bandwidth will support.

DETAILED DESCRIPTION

Customer premises gateways and set-top boxes are increasingly being provisioned with the capability to serve streaming media in both an adaptive and non-adaptive manner. As explained below, the simultaneous delivery of content using heterogeneous delivery mechanisms can sometimes lead to a degradation in the quality of the content that is delivered and denials of service. This problem arises because the gateway or set-top box has limited resources available to it. For instance, network bandwidth, processing power and computing resources (e.g., transcoders, tuners and buffer memory) are generally all limited. Thus, a gateway or set-top that, for instance, is adaptively streaming content to one client is consuming tuner and computing resources that may inhibit it from obtaining and serving content to another client using a non-adaptive streaming technique. The converse is also true. While it is sometimes the case that the network bandwidth may be available to deliver all the content streams that are being requested, the other device resources may prevent them from all being delivered.

As also explained in more detail below, the gateway or set-top box can be provided with a mechanism for specifying how load sharing can be performed when some clients are requesting content to be streamed in accordance with an adaptive streaming technique and other clients at the same time are requesting content to be streamed in accordance with a non-adaptive technique. This mechanism allows the end-user or the service provider to establish a prioritization scheme that gives priority to either delivery of a total number of concurrent streaming media sessions or a quality level of the concurrent streaming media sessions being delivered.

Figure 1:
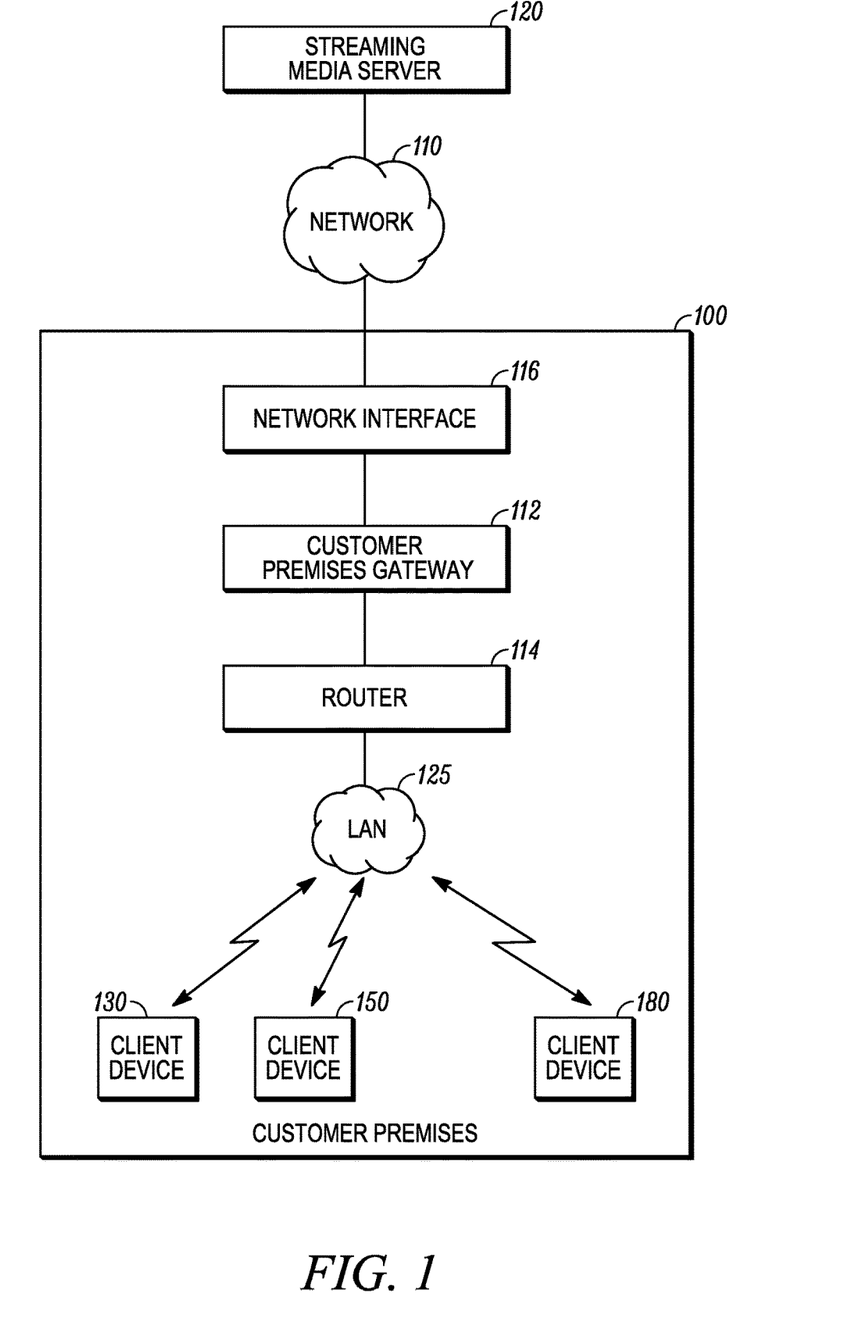
FIG. 1 is a block diagram of one example of an operating environment in which a streaming media server streams content to a customer premises gateway over a network.

Turning to the drawings, wherein like reference numerals refer to like elements, techniques of the present disclosure are illustrated as being implemented in a suitable environment such as shown in FIG. 1. The following description is based on embodiments of the claims and should not be taken as limiting the claims with regard to alternative embodiments that are not explicitly described herein.

As used herein, "streaming media" are media received by and presented to an end-user while being delivered by a streaming provider using any of a variety different methods, including both adaptive and non-adaptive streaming methods. Adaptive streaming enables a media player to request different versions of a media stream in response to changes in network conditions. Each version may have different audio and/or video properties, and therefore certain versions may be more preferable than others for streaming under certain network bandwidth conditions. Various adaptive streaming protocols have been established (or are under discussion by industry standardization bodies). For example, adaptive streaming protocols may include, but are not limited to, hypertext transfer protocol (HTTP) live streaming (HLS), HTTP dynamic streaming (HDS), smooth streaming, and MPEG dynamic adaptive streaming over HTTP (DASH). DASH is also known as international organization for standardization (ISO)/international electrotechnical commission (IEC) 23009-1.

Adaptive streaming generally works by breaking the overall media stream or media file into a sequence of small HTTP-based file downloads, each download loading one short segment of an overall potentially unbounded transport stream or media elementary streams. As the stream is played, the client device (e.g., the media player) may select from a number of different alternate streams containing the same material encoded at a variety of data rates, allowing the streaming media session to adapt to the available data rate. At the start of the streaming media session, the player downloads a playlist or high level manifest containing the metadata for the various sub-streams that are available. The client device requests the stream with a bit rate that is optimized based in part on an analysis of the network environment (e.g., available bandwidth) of the client device. In HLS, for example, the playback device, using the HTTP Live Streaming format, receives the manifest as an m3u8 file that contains links, media uniform resource identifiers (URIs), to each of the segments of video content, and processes the manifest file to retrieve and play back each media segment in turn. Since the client device determines the most suitable or best possible variant bit stream to fetch based on the network environment, adaptive streaming operates in accordance with a best effort model.

Non-adaptive streaming employs a static version of a media stream that is requested by the client device. The client device thus generally requests a static URI for streaming. The static version has a bit rate that does not vary with network conditions and thus non-adaptive streaming does not employ a best effort model. Examples of non-adaptive streaming protocols include, but are not limited to, Digital Living Network Alliance (DLNA) HTTP streaming, which defines interoperability guidelines to enable sharing of digital media between multimedia devices of different vendors, and Home Media Architecture (HMA), which is a proprietary transport approach of Arris Group, Inc.

In a non-adaptive streaming system that conforms to the DLNA guidelines, a DLNA device is certified as belonging to one of a limited number of classes. For instance, a digital media server (DMS) stores content and makes it available to a networked digital media player (DMP) and digital media renderer (DMR). Examples of digital media servers include PCs, network-attached storage devices such as hard drives, set-top boxes, customer premises gateways and digital video recorders (DVR). A digital media player (DMP) finds content on a DMS and provides playback and rendering capabilities. Examples of DMPs include televisions, AV receivers/amplifiers, wireless monitors, and game consoles.

FIG. 1 illustrates one example of an operating environment in which aspects of the techniques described herein may be implemented. In this example a streaming media server 120 delivers streaming media content to multiple customer premises such as customer premises 100, which may be, for example, a residence or business. In general any number of customer premises may be supported utilizing the techniques and mechanisms described herein. Further, multiple servers may provide content and/or may operate together to provide content according to the techniques and mechanisms described herein. For example, in the case of adaptive streaming, one server may create the content, create the manifests and create the multiple media segments and other servers may store and transmit the created content.

Network 110 may be any type of network whether wired, wireless or any combination thereof. For example, network 100 may be a wide area network (WAN) such as the Internet or an intranet. As another example, network 110 may be a cellular network (e.g., 3G, CDMA). In yet another example, network 110 may be a content delivery system such as a broadcast television network, cable data network (e.g. an all-coaxial or a hybrid-fiber/coax (HFC) network), an xDSL (e.g., ADSL, ADLS2, ADSL2+, VDSL, and VDSL2) system, or a satellite television network. In yet other examples the network 110 may be a combination of two or more different types of networks.

A network interface 116 is located at the customer premises 100. The network interface 116 is used to establish communication over the network 110. Network interface 116 may be any of a variety of different types of network interfaces depending on the type of network 110 that is employed. For instance, network interface 116 may be a fiber optic network interface, a cable modem or other type of network interface. A customer premises gateway 112 is communicatively coupled to the network interface 116 by, for example, an Ethernet cable. The customer premises gateway 112 converts the data received from the network interface 116 to a format suitable for distribution to client devices by a router. For instance, the customer premises gateway 112 may convert the data from a link layer protocol such as cable/DOCSIS or DSL to Ethernet. In some cases the functionality of the network interface 116 and the customer premises gateway 112 may be included in a single device.

A router 114 is in turn communicatively coupled to the customer premises gateway 112. The router 114 is capable of wired and/or wireless communication with two or more client devices such as client devices 130, 150 and 180 over a local area network (LAN) 125. That is, the router 114 provides network access to the client devices. The LAN 125 may operate in accordance with any wired and/or wireless protocol such as Ethernet, Wi-Fi (i.e., IEEE 802.11), Multimedia over Coax (MoCA) and power-line communication technologies. In some embodiments the functionality of the gateway 112 and the router 114, or even the gateway 112, router 114 and network interface 116, may be included in a single device.

Client devices 130, 150 and 180 may be any type of electronic devices that are capable of receiving data transmitted over a network and generating output utilizing the data received via the network. For example, client devices 150 and 180 may be televisions, set top boxes, wireless mobile devices, smartphones, tablets, PDAs, entertainment devices such as video game consoles, consumer electronic devices, PCs, etc. The output may be any media type or combination of media types, including, for example, audio and video.

Figure 2:
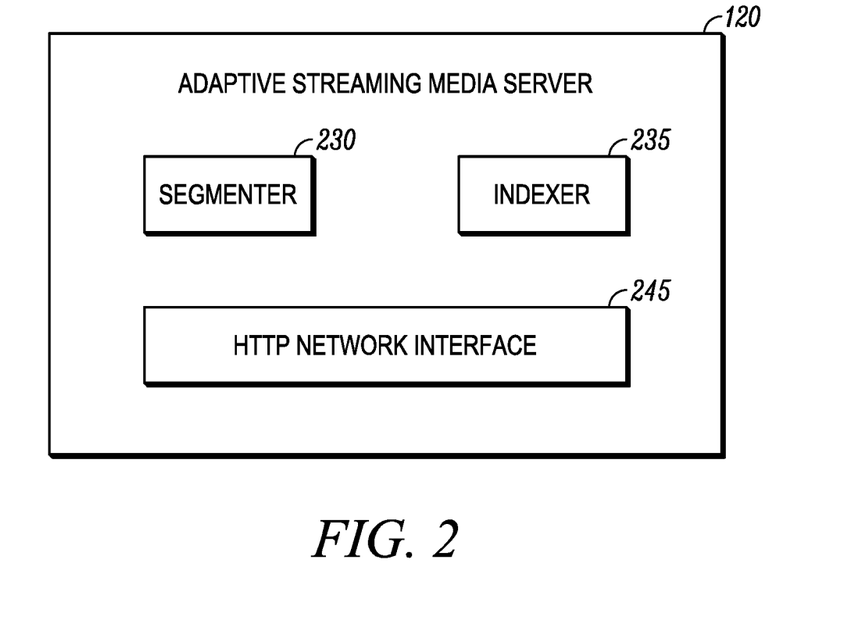
FIG. 2 is a block diagram showing one example of a streaming media server.

Streaming media server 120 may operate as an adaptive and/or non-adaptive server in any manner known in the art. For instance, in one illustrative implementation, the server 120 may be an adaptive streaming server that operates in accordance with HLS, for example. That is, as shown in FIG. 2, in this example server 120 includes a HTTP network interface 245 that provides content using HTTP protocols. While the example presented herein is described in terms of HTTP, other transfer protocols can be utilized in a similar manner. As further shown in FIG. 2, segmenter 230 and indexer 235 are components that reside on server 120 (or multiple servers) to provide content in media segments with a manifest file as described herein. These media segments and manifest files may be provided over the network 110 in FIG. 1 via HTTP network interface 145 (or via other servers) using HTTP protocols. Components as discussed herein can be implemented as hardware, software, firmware or a combination thereof.

Segmenter 230 of server 120 may function to divide the stream of media data into multiple media files or segments that may be transmitted via HTTP protocols. Indexer 235 may function to create a manifest file corresponding to the segmented media files so that client devices can reassemble the media segments to provide real-time, or near real-time, transmission of the content provided by server 120. In response to one or more requests from a client device, HTTP network interface 245 (or other servers) may transmit one or more manifest files as generated by indexer 235 and media segments of content as generated by segmenter 230. Server 120 may also include additional components not illustrated in FIG. 2.

Figure 3:
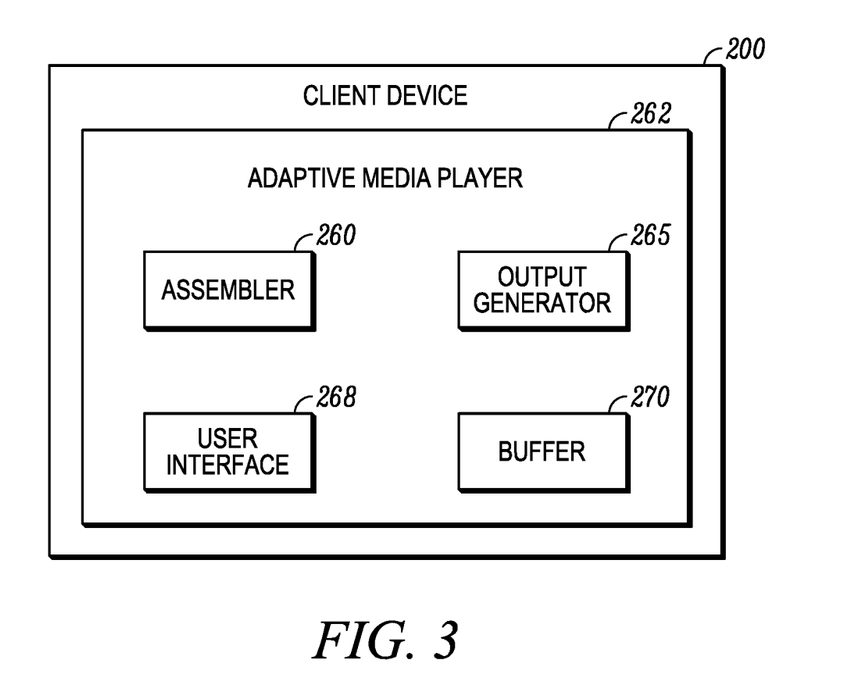
FIG. 3 is a block diagram showing one example of a client device that can present streaming media content received in accordance with an adaptive streaming media protocol.

FIG. 3 shows one example of a client device 200 such as the client devices 130, 150 and 180 shown in FIG. 1. Client device 200 is configured to receive adaptive streaming media. Accordingly, client device 200 includes an adaptive media player 262 that may receive the manifest files and media segments from server 120 over network 110 via customer premises gateway 112. Adaptive media player 262 can include assembler component 260, output generator component 265 and user interface 268. Assembler component 260 receives the manifest files forwarded from server 120 by gateway 112 and use the manifest files to access and download media segments from server 120. Output generator component 265 uses the downloaded media segments to generate output from the client device 200. User interface 268 allows the user to select, play and otherwise control streaming media content. The output may be provided by one or more speakers, one or more display screens, a combination of speakers and display screens or any other input or output device. The adaptive media player 262 can also include memory (e.g. flash memory or DRAM, etc.) to act as a buffer 270 to store the media segments (e.g. compressed media files or decompressed media files) as they are received; the buffer 270 can provide many seconds worth of presentable content beyond the time of content currently being presented so that the buffered content can later be displayed while new content is being downloaded. This buffer 270 can provide presentable content while the client device is attempting to retrieve content through an intermittently slow network connection and hence the buffer can hide network latency or connection problems. Client device 200 may also include additional components not illustrated in FIG. 3.

Figure 4:
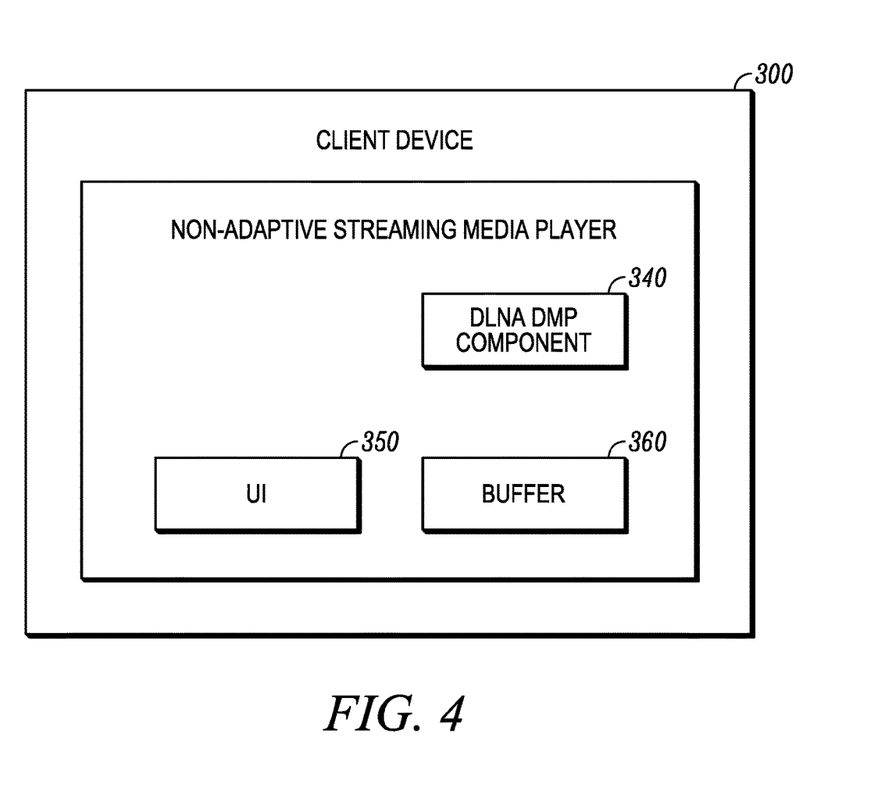
FIG. 4 is a block diagram showing one example of a client device that can present streaming media content received in accordance with a non-adaptive streaming media protocol.

FIG. 4 shows another example of a client device 300 such as the client devices 130, 150 and 180 shown in FIG. 1. Client device 300 is configured to receive non-adaptive streaming media. Client device 300 includes a non-adaptive media player 345 that operates in accordance with a non-adaptive streaming protocol such as DLNA, for example. The media player 345 includes, in the illustrative case of DLNA, a DLNA Digital Media Player (DMP) component 340, user interface 350 and buffer 360. The DMP component 340 functions to locate content on DLNA Digital Media Servers (DMS) and provide playback and rendering capabilities. User interface 350 allows the user to select, play and otherwise control streaming media content. For instance, user interface 350 can provide a display of one or more properties of content located on a storage device. For example, in the case of DLNA, the user interface 350 can provide a display of metadata properties of the content, which is available from a content delivery service database located on the DMS. Similar to client device 200, client device 300 can also include memory (e.g. flash memory or DRAM, etc.) to act as a buffer 270 to store the media content. Client device 300 may also include additional components not illustrated in FIG. 4.

While the client devices 200 and 300 illustrated above are only able to receive and present adaptive and non-adaptive streaming media, respectively, other client devices may be able to receive and present streaming media that conforms to more than one streaming protocol, including both adaptive and non-adaptive streaming protocols.

Figure 5:
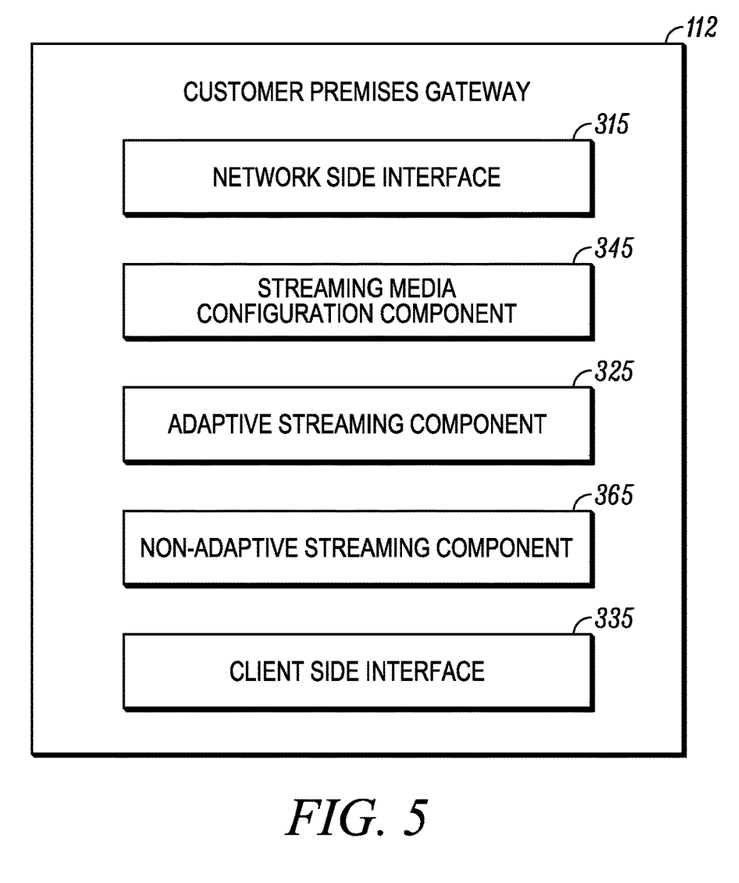
FIG. 5 is a block diagram showing one example of a customer premises gateway that may be used to deliver both adaptive and non-adaptive streaming media to client devices.

FIG. 5 shows one example of the customer premises gateway 112 shown in FIG. 1 which is configured to deliver both adaptive and non-adaptive streaming media to client devices in accordance with a pre-established prioritization scheme. In this example the functionality of the router 114 shown in FIG. 1 is also incorporated into the gateway 112. The gateway 112 includes a network-side interface 315 for establishing communication over the network 110, a client-side interface 335 for establishing communication with the client devices 130, 150, 180, an adaptive streaming component 325 for delivering media streams to the different client devices in accordance with an adaptive streaming technique and a non-adaptive streaming component 365 for delivering media streams to the different client devices in accordance with a non-adaptive streaming technique.

It should be noted that while the techniques described herein for delivering multiple streaming media sessions to client devices are illustrated as being performed by a customer premises gateway, in other embodiments these techniques may be performed by a set-top box or other suitable device, including remotely located cloud-based devices that are accessible by client devices over the network 110.

Figure 6:
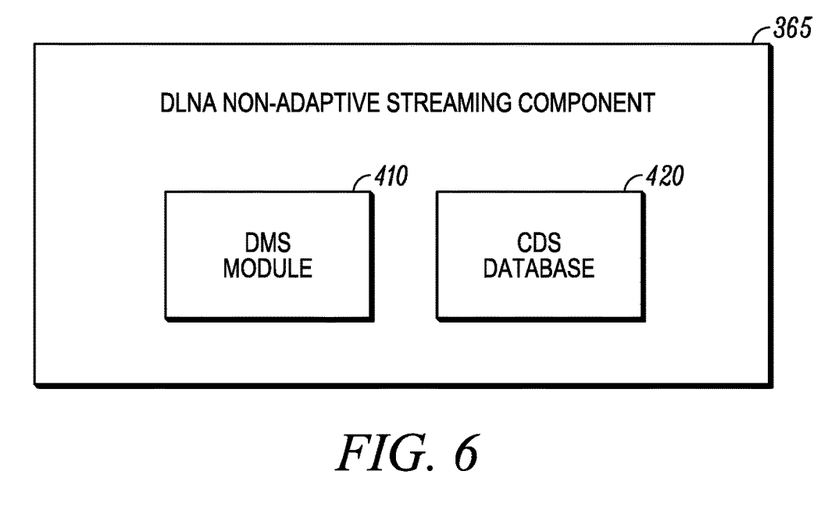
FIG. 6 shows one example of a non-adaptive streaming component that may be employed in the customer premises gateway of FIG. 5.

FIG. 6 shows one example of the non-adaptive streaming component 365 of the gateway 112 when the DLNA protocol is employed. The non-adaptive streaming component 365 includes a DMS module 410 and a CDS database 420. The DMS module 410 may be any suitable DMS product, including both proprietary and non-proprietary DMS products. Examples of commercially available DMS products include PacketVideo, Twonky Server, Microsoft Media Center and Allegro Media Server. The DMS module 410 receives CDS requests from the DMP (e.g., client 300 in FIG. 4) and in response provides the DMP with details concerning the available media contents that are stored in the CDS database 420. In some implementations such as in some of the commercially available DMS products, the CDS database 420 may be incorporated directly in the DMS module 410.

Adaptive streaming component 325 of the gateway 112 communicates manifest and media segment requests from client devices to the adaptive streaming media server using HTTP commands and forwards the received manifest and media segments to the client devices.

Because adaptive streaming employs a best effort model, the client devices try to receive the highest quality presentation by selecting the highest bit rate stream that can be supported by the available network bandwidth. Other clients that are attempting to receive a non-adaptive media stream have no such control since they are requesting content from a static URI. The clients requesting adaptive streaming will attempt to latch up to the highest quality stream that is available and will not be aware that they are consuming device resources such as processing power and buffer memory, for instance, which limit the total number of sessions that can be supported, potentially preventing the client devices who are attempting to receive a non-adaptive media stream from doing so.

As previously mentioned, this problem can be addressed by providing the gateway or set-top box with a mechanism which, in some embodiments, allows the user and/or the service provider to specify how load sharing is to be performed when some clients are requesting content to be streamed in accordance with an adaptive streaming technique and other clients at the same time are requesting content to be streamed in accordance with a non-adaptive technique. This can be accomplished by providing a control mechanism that allows the user and/or the service provider to prioritize the quality of the streaming media sessions that are to be delivered relative to the total number of streaming media sessions that are delivered.

For instance, in some cases it may be more desirable to allow a small number of adaptive streaming media sessions to be delivered with the highest available quality at the expense of limiting the total number of simultaneous streaming media sessions that can be delivered, while in other cases it may be more desirable to limit the quality of the adaptive streaming media sessions that can be delivered while increasing the total number of simultaneous streaming media sessions that can be delivered. By way of example, it may be desirable to limit quality when the media is to be presented on a mobile device that has a small display size. This may be desirable because unless instructed otherwise, a gateway or set-top box may deliver a high-definition stream to a mobile device when a standard definition variant would be sufficient, thus using resources that could otherwise be used to deliver additional streaming sessions.

Referring again to FIG. 5, the customer premises gateway 112 can be provided with a streaming media configuration component 345 through which the user and/or the service provider can establish a prioritization scheme by selectively prioritizing the quality of the streaming media that is delivered relative to the number of streams that are delivered. If these settings are user configurable, then in some implementations it may be accessible to the user through the user interface through which other gateway settings are controlled and managed. If the service provider determines the priority, conventional in-band or out-of-band signaling techniques may be used to deliver control signals to the gateway from the service provider headend.

The prioritization of the number streaming sessions, referred to herein as the session count, relative to quality level can be established by the user or the service provider during a set up phase when the gateway or set-top box is installed and/or when an impending conflict arises. In the latter case the gateway or set-top box can prompt the user to allow a new session and accept lower quality adaptive streaming media sessions, or deny the new session while maintaining the quality of adaptive streaming media sessions. The quality level of the streaming media can be specified in any suitable manner. For instance, it may be defined in terms of resolution by specifying, for example, a format (e.g., standard definition versus high definition), a bit rate and so on.

Significantly, by providing the gateway or set-top box with a prioritization scheme that is configurable, the prioritization of session count versus quality level can be accomplished without the need for any private signaling between the gateway or set-top box and the client devices. Likewise, no modifications to the client devices are needed.

When the streaming media configuration component 345 is used to prioritize the session count over the quality of an adaptive media stream(s) that can be delivered, a specific minimum number of sessions may or may not be specified. In either case, when session count is prioritized and a new adaptive streaming request is received, for instance, the gateway or set-top box will first determine if all the necessary resources are available to fulfill the request. If not, the gateway or set-top box will only fetch a high level manifest for the requested adaptive streaming media for a stream that has a bit rate that allows the newly requested session and any ongoing sessions to be served. Even if a client device requests a manifest for a higher quality stream, the gateway or set-top box will re-route the request to a suitable manifest for a stream having a lower bit rate. Alternatively, the gateway or set-top box may modify the high level manifest (by e.g., adding or deleting entries such that it points to an appropriate lower bit rate playlist)) for the newly requested streaming media so that both the newly requested streaming media session and any ongoing sessions can be delivered. Alternatively, the gateway or set-top box may modify the manifest (by e.g., adding or deleting entries) for the newly requested streaming media so that both the newly requested streaming media session and any ongoing sessions can be delivered. Alternatively, if a client device requests a URI of a higher quality stream within a playlist, the gateway or set-top box will re-route the request to a suitable URI for a stream having a lower bit rate or respond with lower bit rate content.

In another embodiment, the streaming media configuration component may be used to prioritize the session count over the quality of a non-adaptive media stream(s) that can be delivered, for instance, in accordance with DLNA. In this embodiment the gateway or set-top box will only allow content items published in the CDS to be streamed to a client device if they have a quality level that does not exceed some maximum quality level. In some cases the gateway or set-top box will remove those items from the CDS that exceed the maximum quality level so that they cannot be selected by the user.

If the user or service provider prioritizes quality over session count, the gateway or set-top box will limit the total number of streaming media sessions that may be simultaneously delivered so that a minimum quality level of the various adaptive streaming media sessions can be maintained. This minimum level may be specified by the user or service provider, or it may be calculated dynamically by the gateway or set-top box based on the current resources being consumed. Thus, if for example a new streaming media session is requested while one or more adaptive streaming media sessions are already in progress, the newly requested session may be denied if it would require the quality level of any of the ongoing sessions to be reduced below the minimum specified level.

Figure 7:
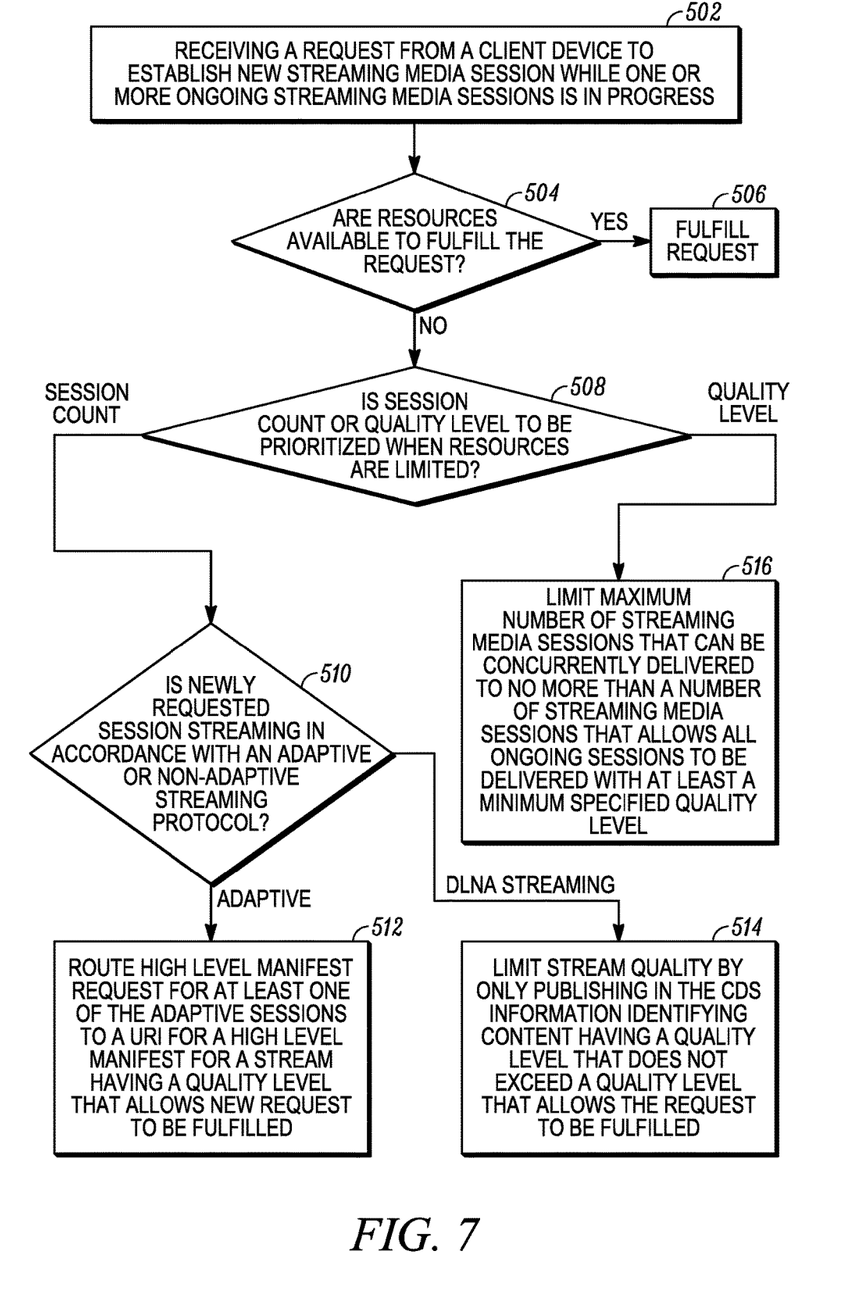
FIG. 7 shows one example of a method for delivering two or more concurrent streaming media sessions to client devices in accordance with a pre-established prioritization scheme.

FIG. 7 is a flowchart illustrating one example of a method for delivering two or more concurrent streaming media sessions to client devices in accordance with a pre-established prioritization scheme. The method begins at block 502 when a request is received by a customer premises gateway or a set top box from a client device to establish a new streaming media session while one or more ongoing streaming media sessions are already in progress. The gateway or set-top box determines at block 504 if it has all the resources necessary to fulfill the request. As previously mentioned, such resources may include, in addition to network bandwidth, computing resources such as transcoders, tuners and buffer memory. If it does have the necessary resources the gateway or set top box then fulfills the request at block 506 in accordance with the streaming media protocol that is employed by the requested session. If all of the necessary resources are not available, the method proceeds to decision block 508.

At decision block 508, the gateway or set-top box examines the pre-established prioritization scheme to determine whether the number of streaming sessions that can be supported (the session count) or the quality level of the streaming sessions is to be prioritized when resources are limited. If session count is to be given priority, then at decision block 510 the gateway or set-top box determines if the newly requested session is to be streamed in accordance with an adaptive streaming protocol or a non-adaptive streaming protocol. If an adaptive protocol is employed, the method continues to block 512 where the gateway or set-top box receives a request from a client device for a high level manifest for at least one of the adaptive sessions. Because of the limited resources available, the gateway or set top box reroutes the request to a different URI, which is for a high level manifest for a stream having a lower quality level that allows the new request to be fulfilled. In this way the ongoing and the new streaming sessions can all be delivered in accordance with the pre-established prioritization scheme.

If on the other hand at decision block 510 the gateway or set-top box determines that the newly requested session is streamed in accordance with a non-adaptive streaming protocol, then the method proceeds to block 514, where for purposes of illustration the non-adaptive technique is assumed to be DNLA. At block 514 the gateway or set-top box limits the quality of the stream that is accessible by only publishing in the CDS information identifying content having a quality level that does not exceed a quality level that allows the request to be fulfilled.

Returning to decision block 508, if the gateway or set-top box determines that the pre-established prioritization scheme prioritizes the quality level of the streams over the session count, the method continues at block 516 where the gateway or set-top box limits the maximum number of streaming media sessions that can be concurrently delivered to no more than a number of streaming media sessions that allows all of the ongoing sessions currently to be delivered with at least the minimum quality level specified by the pre-established prioritization scheme.

Of course, the techniques described herein for managing the delivery of different streaming media sessions to client devices are not limited to the particular example shown in FIG. 7. For example, while the method of FIG. 7 is presented as limiting the quality level of the newly requested media stream session in order to satisfy the pre-established prioritization scheme, more generally the gateway or set-top box may limit the quality of the newly requested streaming media session and/or one or more of the ongoing streaming media sessions, depending on a variety of factors, including possibly settings that are specified by the user or service provider as part of the pre-established prioritization scheme.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 8:
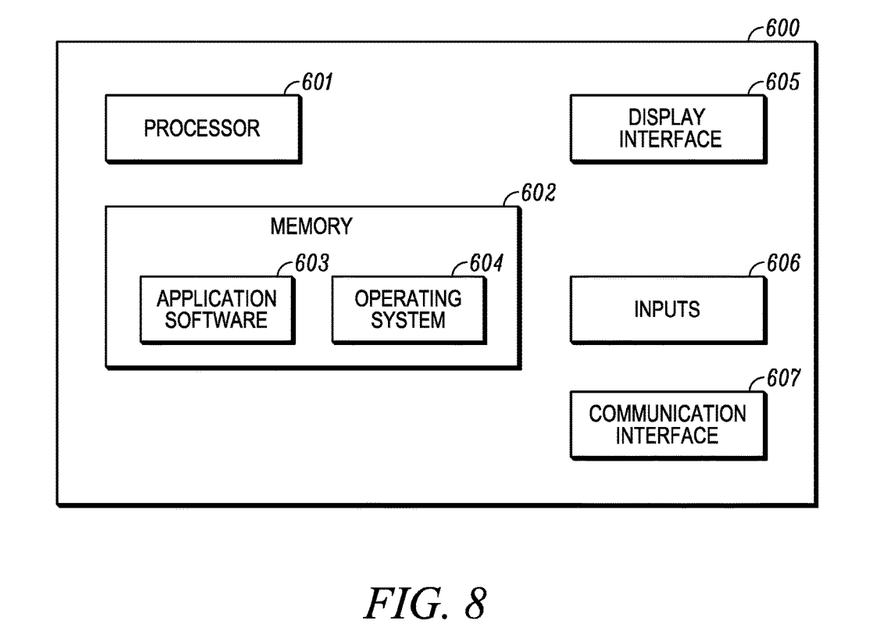
FIG. 8 is a block diagram of various components of an illustrative computing-based device in which the gateway, set top box and/or client device shown in the various figures may be implemented.

FIG. 8 illustrates various components of an illustrative computing-based device 600 which may be implemented as any form of a computing and/or electronic device, and in which embodiments of a server, customer premises gateway, set-top box and/or a client device as described above may be implemented.

The computing-based device 600 comprises one or more inputs 606 which are of any suitable type for receiving media content, Internet Protocol (IP) input, activity tags, activity state information, resources or other input. The device also comprises communication interface 607 to enable the device to communicate with one or more other entity using any suitable communications medium.

Computing-based device 600 also comprises one or more processors 601 which may be microprocessors, controllers or any other suitable type of processors for processing computing executable instructions to control the operation of the device in order to provide a search augmentation system. Platform software comprising an operating system 604 or any other suitable platform software may be provided at the computing-based device to enable application software 603 to be executed on the device.

The computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 605 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

The invention claimed is:

1. A method for delivering two or more concurrent streaming media sessions to client devices, comprising:
   receiving a request from a client device to establish a new streaming media session while one or more ongoing streaming media sessions is in progress;
   determining if resources are available to fulfill the request; and
   when one or more resources needed to fulfill the request are unavailable because of one or more ongoing streaming media sessions, responding to the request in accordance with a pre-established prioritization scheme that gives priority to either delivery of a total number of concurrent streaming media sessions or a quality level of the concurrent streaming media sessions being delivered,
   wherein the pre-established prioritization scheme prioritizes the total number of concurrent streaming media sessions over the quality level of the concurrent streaming media sessions and further comprising limiting at least one of the ongoing streaming media sessions or the new streaming media session to be established to a quality level that allows the request to be fulfilled and which is less than a maximum available quality level,
   wherein the streaming media session being limited in quality is streamed to a given client device in accordance with an adaptive streaming protocol and further comprising sending a manifest to the given client device for a media stream having a quality level that does not exceed a quality level that allows the request to be fulfilled, and
   wherein sending the manifest to the given client device includes receiving from the given client device a request for a manifest Uniform Resource Identifier (URI) for a media stream having a quality level that exceeds the quality level that allows the request to be fulfilled and rerouting the request to another manifest URI for the media stream having a quality level that does not exceed the quality level that allows the new request to be fulfilled.

2. The method of claim 1, wherein the pre-established prioritization scheme is user-specified.

3. The method of claim 1, wherein the pre-established prioritization scheme is specified by a service provider from a remote location over a wide-area network.

4. The method of claim 1, wherein the streaming media session being limited in quality is streamed to a given client device in accordance with a DLNA streaming protocol and further comprising publishing only content having a quality level that does not exceed a quality level that allows the request to be fulfilled.

5. The method of claim 1, wherein either the new streaming media session or one of the ongoing streaming media sessions is streamed in accordance with an adaptive streaming protocol and another of the new streaming media session or one of the ongoing streaming media sessions is streamed in accordance with a non-adaptive streaming protocol.

6. A customer premises gateway or set-top box comprising:
   a network-side interface for communicating over a wide-area network (WAN);
   a client-side interface establishing communication between the WAN and a plurality of client devices that process streaming media;
   a non-adaptive streaming media component for causing non-adaptive streaming media to be streamed to the client devices;
   an adaptive streaming media component for causing adaptive streaming media to be streamed to the client devices; and
   a streaming media configuration component for selectively prioritizing either a total number of concurrent streaming media sessions to be delivered or a quality level of the concurrent streaming media sessions to be delivered,
   wherein, when the streaming media configuration component is configured to prioritize the total number of concurrent streaming media sessions over the quality level of the concurrent streaming media sessions, the streaming media configuration component is arranged to limit at least one of an ongoing streaming media session and/or a newly requested streaming media session to be established to a quality level that allows the newly requested streaming media session to be established at a quality less than a maximum available quality level, wherein when the streaming media session being limited in quality is streamed to a given client device in accordance with an adaptive streaming protocol, the streaming media configuration component is further configured to send a manifest to the given client device for a media stream having a quality level that does not exceed a quality level that allows the request to be fulfilled, and wherein, when the streaming media configuration component receives from the given client device a request for a manifest Uniform Resource Identifier (URI) for a media stream having a quality level that exceeds the quality level that allows the request to be fulfilled, the streaming media configuration component is configured to reroute the request to another manifest URI for the media stream having a quality level that does not exceed the quality level that allows the new request to be fulfilled.

7. The customer premises gateway or set-top box of claim 6, wherein the streaming media configuration component is user configurable.

8. The customer premises gateway or set-top box of claim 6, wherein the streaming media configuration component is configurable by a service provider from a remote location over a wide-area network.

9. The customer premises gateway or set-top box of claim 6, wherein, when the streaming media configuration component is configured to prioritize the total number of concurrent streaming media sessions over quality and both adaptive and non-adaptive streaming media sessions are to be delivered, the streaming media configuration component is further arranged to limit the quality of the adaptive media session.

10. The customer premises gateway or set-top box of claim 6, wherein the streaming media session being limited in quality is streamed to a given client device in accordance with a DLNA streaming protocol, the streaming media configuration component is configured to publish only content having a quality level that does not exceed a quality level that allows the request to be fulfilled.

11. The customer premises gateway or set-top box of claim 6, wherein, when the quality of the concurrent streaming media sessions is prioritized over the number of concurrent streaming media sessions, the streaming media configuration component is further configured to limit a maximum number of streaming media sessions that can be concurrently delivered to no more than a number of streaming media sessions that allows all of the ongoing sessions currently to be delivered with at least a minimum quality level specified by a pre-established prioritization scheme.

12. The customer premises gateway or set-top box of claim 6, wherein the media stream associated with the manifest URI to which the request is re-routed has a lower bit rate than a bit rate of the media stream associated with the requested manifest URI.

* * * * *